(12) United States Patent
Ishikawa et al.

(10) Patent No.: US 7,672,329 B2
(45) Date of Patent: Mar. 2, 2010

(54) METHOD AND APPARATUS FOR MULTIPLEXING AND DEMULTIPLEXING DATA, AND COMPUTER PRODUCT

(75) Inventors: Kenichi Ishikawa, Fukuoka (JP); Kouichi Kitano, Kawasaki (JP); Tsuyoshi Matsumoto, Kawasaki (JP); Junichi Sawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 989 days.

(21) Appl. No.: 11/340,840

(22) Filed: Jan. 27, 2006

(65) Prior Publication Data

US 2007/0086491 A1 Apr. 19, 2007

(30) Foreign Application Priority Data

Oct. 13, 2005 (JP) ............................. 2005-299347

(51) Int. Cl.
*H04J 3/22* (2006.01)
*H04J 3/06* (2006.01)
*H04J 14/00* (2006.01)

(52) U.S. Cl. ...................... 370/465; 370/516; 370/535; 398/53

(58) Field of Classification Search ......... 370/516–519, 370/535–545; 398/43, 52–53, 158–161
See application file for complete search history.

(56) References Cited

U.S. PATENT DOCUMENTS

| 5,878,039 | A  | * | 3/1999  | Gorshe et al. ............... 370/376 |
| 6,697,386 | B2 | * | 2/2004  | Sugawara et al. ........... 370/535 |
| 7,120,169 | B2 | * | 10/2006 | Wolf et al. .................. 370/503 |
| 7,515,832 | B2 | * | 4/2009  | Kikuchi ...................... 398/161 |
| 2002/0114416 | A1 | * | 8/2002 | Enam et al. ................. 375/373 |

FOREIGN PATENT DOCUMENTS

JP 58-94251 6/1983
JP 8-251128 9/1996

* cited by examiner

*Primary Examiner*—Tri H Phan (57) ABSTRACT

A generating unit generates an apparatus reference frame phase that becomes a reference in a data multiplexing/demultiplexing apparatus, based on a reception frame phase of the data input to a predetermined reception buffer and a predetermined delay amount. A multiplexing/demultiplexing unit reads data from the reception buffer based on the apparatus reference frame phase generated by the generating unit, and multiplexes or demultiplexes the data.

7 Claims, 5 Drawing Sheets

METHOD AND APPARATUS FOR MULTIPLEXING AND DEMULTIPLEXING DATA, AND COMPUTER PRODUCT

BACKGROUND OF THE INVENTION

1. Field of the Invention

The present invention relates to a technology for multiplexing and demultiplexing data between a high-speed line and a low-speed line using a reception buffer and a transmission buffer.

2. Description of the Related Art

Recently, a network mode that accommodates a large amount of data in a bulk structure on a high-speed line is increasingly used, while a backbone network of a low-speed line is still used.

Conventionally, data transfer is performed between the high-speed line and the low-speed line by multiplexing and demultiplexing the data. For example, Japanese Patent Application Laid-open No. H8-251128 discloses a technique in which a uniform clock synchronization is performed in a reception buffer of each of lines by selecting a normal line extracting clock from the lines and generating a reference clock in an apparatus. Japanese Patent Application Laid-open No. S58-094251 discloses a technique in which a frame phase synchronization is performed by generating an apparatus reference frame phase in a free-running state and absorbing a delay in a reception buffer of each of the lines.

However, according to the conventional techniques, a transmission delay (a delay of data transfer between the high-speed line and the low-speed line) cannot be reduced, and compensation of frame phase (compensation of frame phase with respect to the line having the bulk structure) cannot be performed.

In other words, in the technique disclosed in Japanese Patent Application Laid-open No. H8-251128, since the process timing of the reception buffer in the respective lines is only adjusted by synchronizing the clock, the transmission delay cannot be shortened, and the frame phase cannot be compensated.

In the technique disclosed in Japanese Patent Application Laid-open No. S58-094251, since the apparatus reference frame phase is generated in the free-running state to perform the frame phase synchronization, the frame phase cannot always be compensated, and the transmission delay cannot be shortened.

SUMMARY OF THE INVENTION

It is an object of the present invention to at least solve the problems in the conventional technology.

An apparatus according to one aspect of the present invention, which is for multiplexing or demultiplexing data between a high-speed line and a low-speed line using a reception buffer and a transmission buffer, includes a generating unit that generates an apparatus reference frame phase that becomes a reference in the apparatus, based on a reception frame phase of the data input to a predetermined reception buffer and a predetermined delay amount; and a multiplexing/demultiplexing unit that reads data from the reception buffer based on the apparatus reference frame phase generated by the generating unit, and multiplexes or demultiplexes the data.

A method according to another aspect of the present invention, which is for multiplexing or demultiplexing data between a high-speed line and a low-speed line using a reception buffer and a transmission buffer, includes generating an apparatus reference frame phase that becomes a reference in the apparatus, based on a reception frame phase of the data input to a predetermined reception buffer and a predetermined delay amount; reading data from the reception buffer based on the apparatus reference frame phase generated at the generating; and multiplexing or demultiplexing the data.

A computer-readable recording medium according to still another aspect of the present invention stores a computer program that causes a computer to execute the above method according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings.

Figure 1:
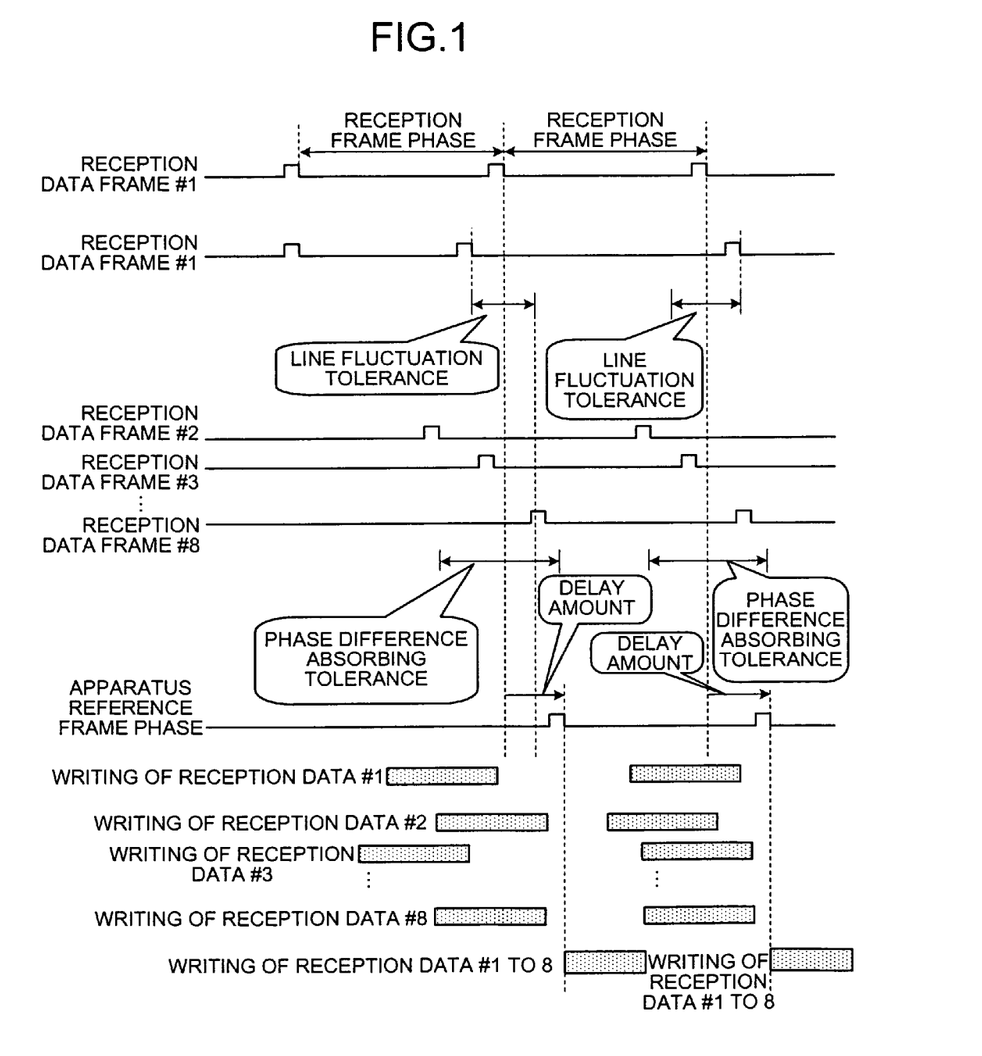
FIG. 1 is a schematic for illustrating outline and characteristics of a data multiplexing/demultiplexing apparatus according to a first embodiment of the present invention.

FIG. 1 is a schematic for illustrating outline and characteristics of a data multiplexing/demultiplexing apparatus according to a first embodiment of the present invention. In the example shown in FIG. 1, one data is demultiplexed into eight pieces and transmitted, and received data demultiplexed into eight pieces is multiplexed into one data.

The data multiplexing/demultiplexing apparatus performs a multiplexing process by reading data #1 to #8 respectively written in reception buffers #1 to #8. Basically, in the data multiplexing/demultiplexing apparatus, it is desired that reception phase frames of the data #1 to #8 respectively input to the respective reception buffers #1 to #8 are always the same. That is, it is desired that the data #1 to #8 are written in the respective reception buffers #1 to #8 at the same time, and the sequentially received data is written simultaneously at the same timing (at the same phase interval). However, since the timing for receiving the data is not at the same interval in the same reception buffer, "fluctuation" such as earlier or later reception of data as seen from a predetermined phase occurs. Furthermore, since the timing for receiving the data by the respective reception buffers #1 to #8 is not at the same interval, a "phase difference" such as earlier or later reception as seen from the predetermined phase occurs between the respective buffers.

Therefore, when reading data immediately after the input of the data to the reception buffer, there is a possibility that input of data to all reception buffers has not been completed yet by the time when read in is started, due to the fluctuation and the phase difference, thereby causing a problem in that the frame phase compensation (frame phase compensation with respect to the line having a bulk structure) cannot be performed. On the other hand, when read in is carried out after long time has passed after the input of data to the reception buffer, there is a problem in that a time loss occurs between input and read in of data, and hence, the transmission delay cannot be shortened.

A main feature of the data multiplexing/demultiplexing apparatus according to the first embodiment is enabling frame phase compensation and transmission delay reduction by generating an apparatus reference frame phase as a reference in the apparatus based on the reception frame phase and optional delay amount of data input to a predetermined reception buffer (for example, a reception buffer expediently selected from a smaller port number sequentially under a condition that the input data is normal), reading the data from the reception buffer according to the generated apparatus reference frame phase, and multiplexing or demultiplexing the data.

In the data multiplexing/demultiplexing apparatus according to the first embodiment, an expected line fluctuation tolerance (largest width of assumed fluctuation) and an expected phase difference tolerance (largest width of assumed phase difference) are taken into consideration, and a delay amount capable of absorbing the line fluctuation tolerance and the phase difference tolerance is preset. The apparatus reference frame phase is generated based on the set delay amount.

Specifically, a reception frame phase of reception buffer #1, of the reception buffers #1 to #8 provided in lines #1 to #8, is obtained, and the preset delay amount is added to the reception frame phase of the reception buffer #1 to generate the apparatus reference frame phase.

The data multiplexing/demultiplexing apparatus reads the data from the reception buffer according to the generated apparatus reference frame phase, and the data is subjected to multiplexing. The data is read from the respective reception buffers #1 to #8 according to the generated apparatus reference frame phase, and is subjected to multiplexing.

As explained above, the apparatus reference frame phase as the reference in the apparatus is generated based on the reception frame phase of data input to the reception buffer #1 and the optional delay amount, and the data is read from the respective reception buffers #1 to #8 according to the generated apparatus reference frame phase and is subjected to multiplexing or demultiplexing. Accordingly, it is prevented that readout of data from the reception buffers #1 to #8 fails, and the time from data input to the reception buffers #1 to #8 until readout of the data therefrom is shortened, thereby enabling the frame phase compensation and reduction of the transfer delay.

Figure 2:
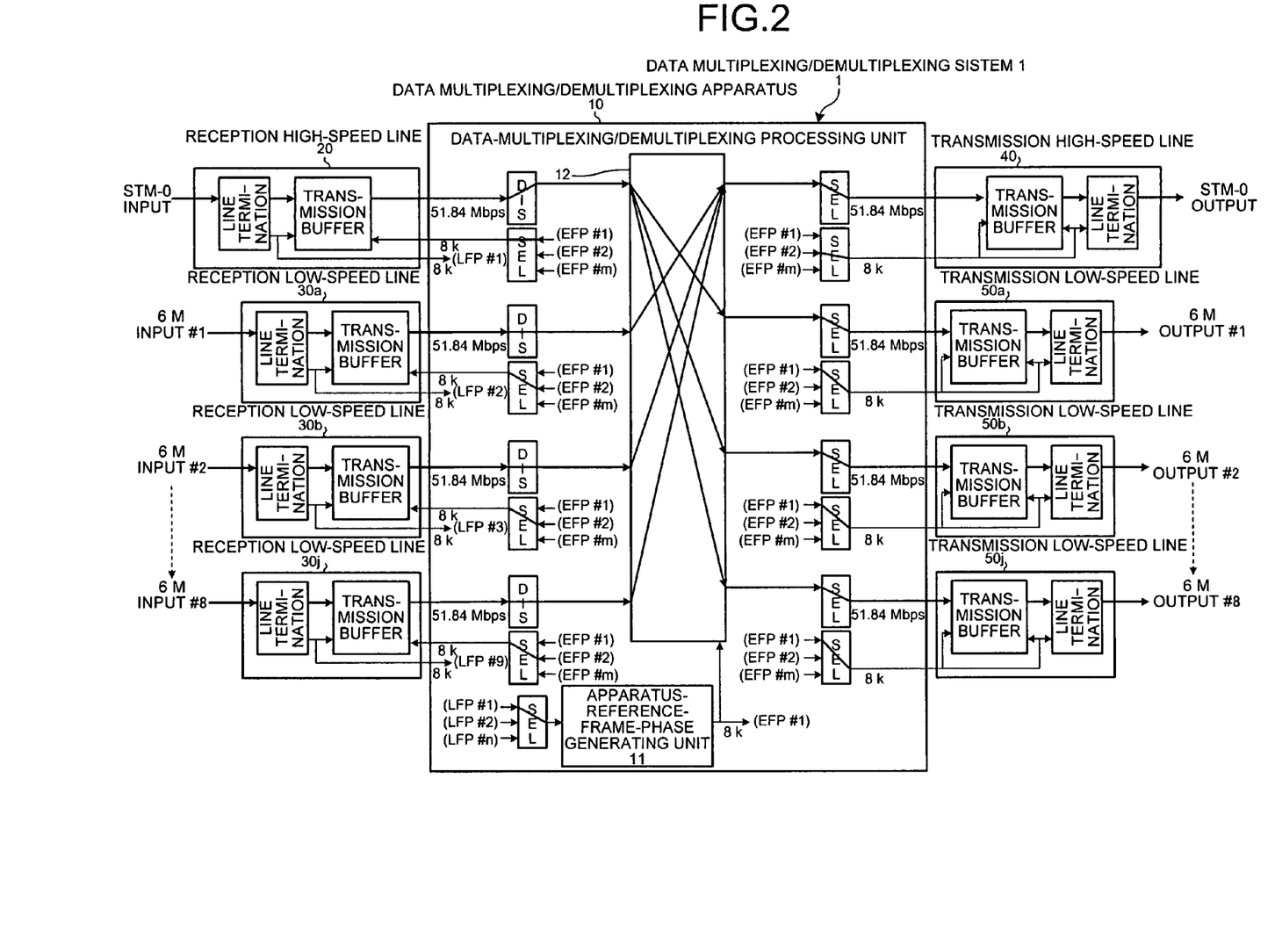
FIG. 2 is a schematic of the data multiplexing/demultiplexing apparatus according to the first embodiment.

FIG. 2 is a schematic of the data multiplexing/demultiplexing apparatus according to the first embodiment. A data multiplexing/demultiplexing system 1 includes a data multiplexing/demultiplexing apparatus 10, a reception high-speed line 20, reception low-speed lines 30a to 30j, a transmission high-speed line 40, and transmission low-speed lines 50a to 50j. In the data multiplexing/demultiplexing system 1, the data multiplexing/demultiplexing apparatus 10 reads data input to a reception buffer of the reception high-speed line 20, separates the data and inputs the data to transmission buffers of the respective transmission low-speed lines 501 to 50j. On the other hand, the data multiplexing/demultiplexing apparatus 10 reads data input to reception buffers of the reception low-speed lines 30a to 30j, multiplexes the data, and inputs the data to a transmission buffer of the transmission high-speed line 40.

The data multiplexing/demultiplexing apparatus 10 includes an apparatus-reference-frame-phase generating unit 11, and a multiplexing/demultiplexing processing unit 12.

The apparatus-reference-frame-phase generating unit 11 generates the apparatus reference frame phase as a reference in the apparatus based on the reception frame phase of the data input to the predetermined reception buffer and the optional delay amount. When the data is input to the predetermined reception buffer (for example, the reception buffer of the reception low-speed line 30a) of the respective reception low-speed lines 30a to 30j, the apparatus-reference-frame-phase generating unit 11 obtains the reception frame phase of the reception buffer to which the data is input, and adds the preset delay amount to the reception frame phase of the reception buffer #1, to generate the apparatus reference frame phase. The optional delay amount is predetermined, taking fluctuation and the phase difference into consideration.

The multiplexing/demultiplexing processing unit 12 reads the data from the reception buffer according to the apparatus reference frame phase, and subjects the data to multiplexing or demultiplexing. Upon receiving a read signal by the apparatus reference frame phase generated by the apparatus-reference-frame-phase generating unit 11, the multiplexing/demultiplexing processing unit 12 reads the data from the respective reception buffers #1 to #8 according to the generated apparatus reference frame phase and subjects the data to multiplexing or demultiplexing.

Figure 3:
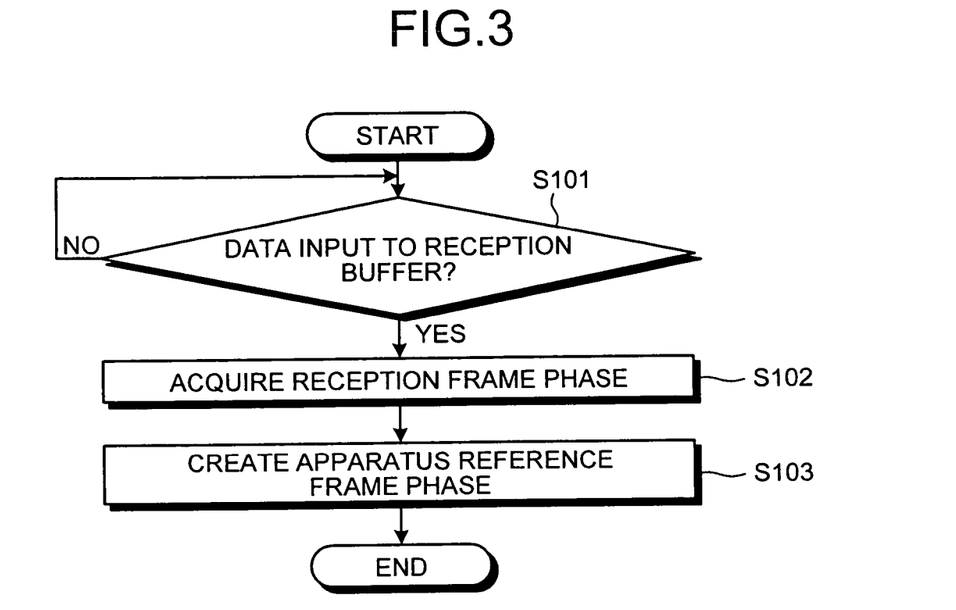
FIG. 3 is a flowchart of a processing procedure for an apparatus-reference-frame-phase generation process according to the first embodiment.

FIG. 3 is a flowchart of a processing procedure for an apparatus-reference-frame-phase generation process according to the first embodiment.

When the data is input to a predetermined reception buffer (for example, the reception buffer of the reception low-speed line 30a) of the respective reception low-speed lines 30a to 30j (step S101, Yes), the data multiplexing/demultiplexing apparatus obtains the reception frame phase of the reception buffer to which the data is input (step S102), and adds the preset delay amount to the reception frame phase of the reception buffer #1 to generate the apparatus reference frame phase (step S103).

Figure 4:
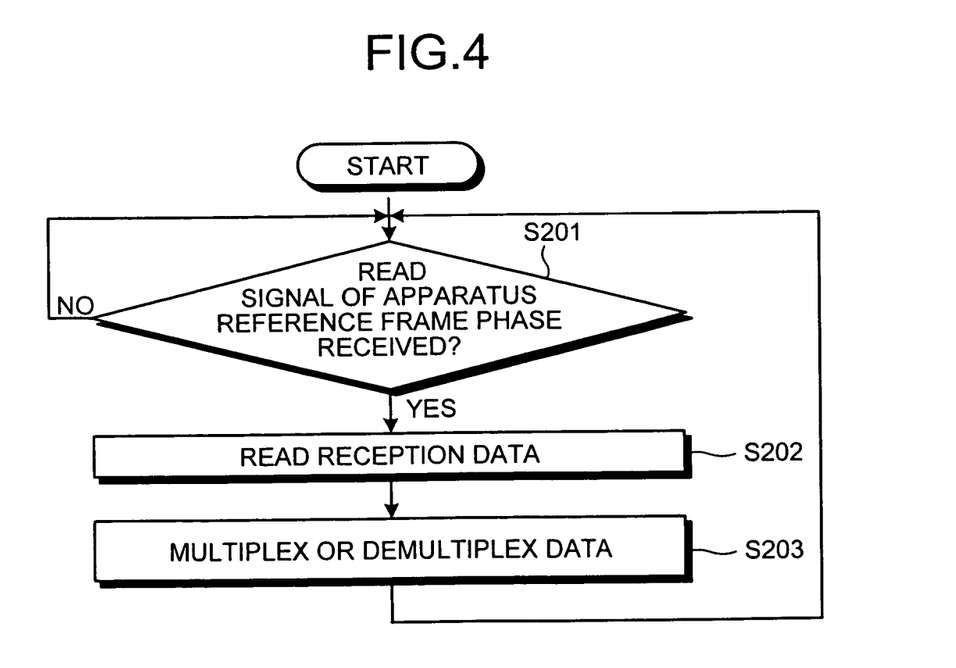
FIG. 4 is a flowchart of a processing procedure for demultiplexing data according to the first embodiment.

FIG. 4 is a flowchart of a processing procedure for demultiplexing data according to the first embodiment.

Upon receiving the read signal by the apparatus reference frame phase generated by the apparatus-reference-frame-phase generating unit 11 (step S201, Yes), the data multiplexing/demultiplexing apparatus reads the data from the respective reception buffers #1 to #8 according to the generated apparatus reference frame phase (step S202), and subjects the data to multiplexing or demultiplexing (step S203).

According to the first embodiment, the apparatus reference frame phase as the reference in the apparatus is generated based on the reception frame phase of data input to the reception buffer #1 and the optional delay amount, the data is read from the reception buffers #1 to #8 according to the generated apparatus reference frame phase, and the data is subjected to multiplexing or demultiplexing. Accordingly, it is prevented that readout of data from the reception buffers #1 to #8 fails, and the time from data input to the reception buffers #1 to #8 until readout of the data therefrom is shortened, thereby enabling the frame phase compensation and reduction of the transfer delay.

Furthermore, according to the first embodiment, the apparatus reference frame phase is generated based on the optional delay amount obtained by taking into consideration any one of the fluctuation of the data input to the reception buffer #1 and the phase difference of data input to the reception buffers #1 to #8 or both. As a result, the apparatus reference frame phase is generated based on more appropriate delay amount, thereby enabling reduction of the transfer delay, while compensating the frame phase more appropriately.

According to the present invention, the apparatus reference frame phase is generated based on the optional delay amount obtained by taking into consideration any one of the fluctuation and the phase difference obtained beforehand or both. Accordingly, for example, the apparatus reference frame phase can be easily generated without monitoring the fluctuation or the phase difference in real time.

According to the first embodiment, an example where the delay amount is set by taking into consideration both of the line fluctuation tolerance (largest width of assumed fluctuation) and the phase difference tolerance (largest width of assumed phase difference) has been explained. However, the present invention is not limited to the example, and the delay amount can be set by taking into consideration only one of the line fluctuation tolerance and the phase difference tolerance.

Furthermore, according to the first embodiment, an example where a delay amount capable of absorbing the line fluctuation tolerance and the phase difference tolerance is preset by taking into consideration the expected line fluctuation tolerance (largest width of assumed fluctuation) and phase difference tolerance (largest width of assumed phase difference) has been explained. However, the present invention is not limited to the example, and the fluctuation and the phase difference actually occurring in the apparatus are measured and the delay amount can be set from the measurement result in real time.

Therefore, the delay amount is measured corresponding to a change in any one of the fluctuation and the phase difference or both, and the apparatus reference phase frame is generated based on the delay amount obtained by the measurement. As a result, the apparatus reference phase frame can be generated more appropriately corresponding to a real-time change, without presetting and fixing the apparatus reference phase frame.

According to the first embodiment, an example where the reception frame phase of the reception buffer selected at random is obtained has been explained. However, the present invention is not limited to the example, and the reception buffer can be selected based on a phase difference of the reception buffer. For example, the timing at which the data is received by the respective reception buffers is measured, and the reception buffer having the smallest phase difference (that is, a reception buffer that receives the data midway among the reception buffers, which receive the data early or late, as seen from the predetermined phase) is selected from the respective reception buffers, thereby obtaining the reception frame phase of the selected reception buffer.

A predetermined reception buffer is thus selected based on the phase difference of the data input to the reception buffers, and the apparatus reference frame phase is generated based on the reception frame phase of the data input to the reception buffer. Therefore, for example, a reception buffer having a small phase difference is selected and the apparatus reference frame phase is generated based on the reception frame phase of the data input to the reception buffer. As a result, a more appropriate apparatus reference frame phase can be generated.

According to the first embodiment, a case that only a line group having a bulk structure is accommodated has been explained. However, the present invention is not limited to the case, and a frame phase-free line (a line for transferring data by a single line) can be accommodated together with the line group having the bulk structure simultaneously by the same transmission line.

Figure 5:
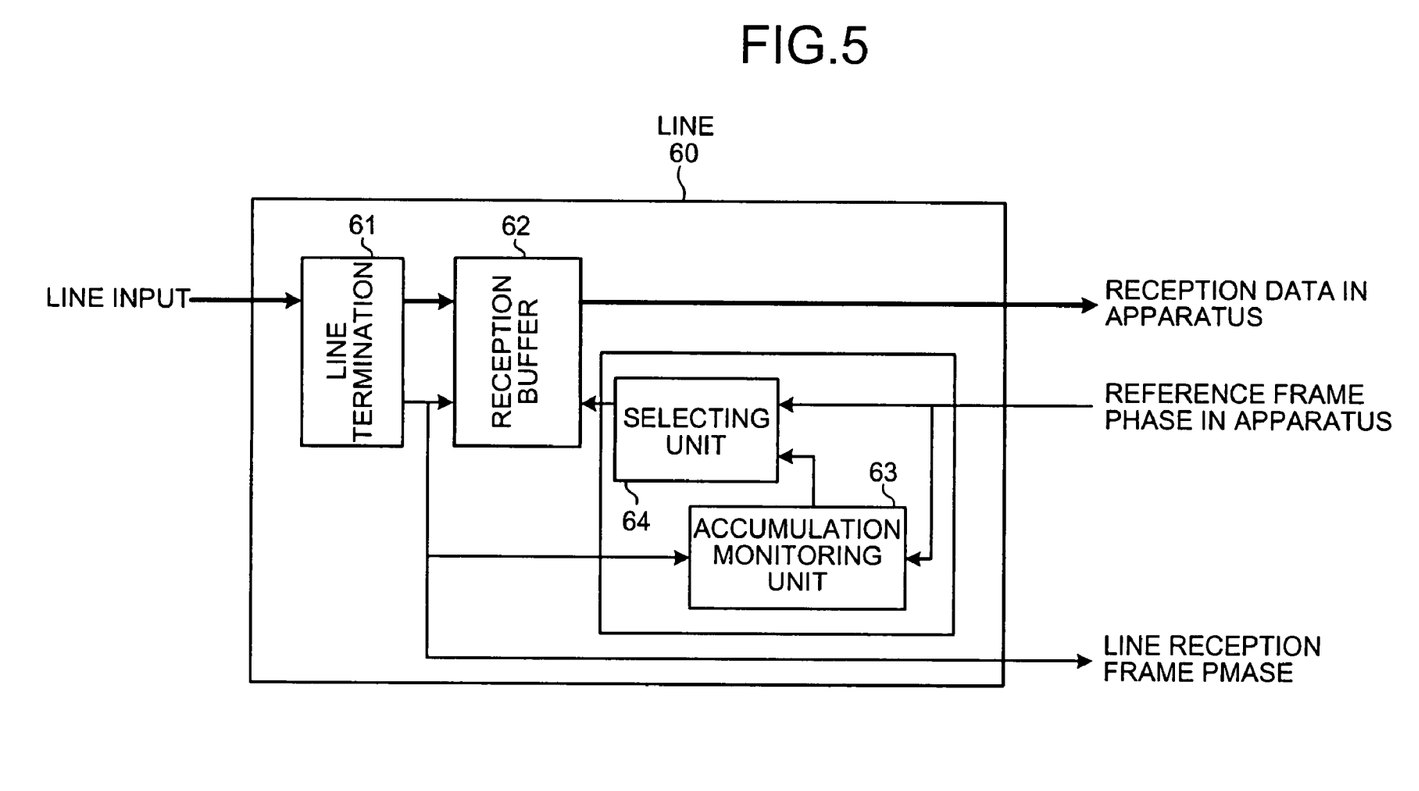
FIG. 5 is a schematic for illustrating a configuration of a line according to a second embodiment of the present invention.

FIG. 5 is a schematic for illustrating a configuration of a line according to a second embodiment of the present invention. While a line 60 corresponds to the reception high-speed line 20 or the reception low-speed line 30 in the first embodiment, the line 60 is different in that it newly includes an accumulation monitoring unit 63 and a selecting unit 64, as compared with the reception high-speed line 20 or the reception low-speed line 30 in the first embodiment shown in FIG. 2.

The accumulation monitoring unit 63 monitors whether a specified amount (for example, data amount for one frame length) or more has been accumulated in a reception buffer 62. When the data has been accumulated in the specified amount or more, the accumulation monitoring unit 63 notifies the selecting unit 64 of a readout signal of the data at the timing of the apparatus reference frame phase. The selecting unit 64 selects whether the data is to be read according to the apparatus reference frame phase or according to the monitoring result by the accumulation monitoring unit 63.

In the line 60, for example, when the line group having the bulk structure is accommodated, the selecting unit 64 selects an apparatus reference frame phase, and allows the data multiplexing/demultiplexing apparatus to read the data according to the apparatus reference frame phase. When the frame phase-free line is accommodated, the selecting unit 64 selects the monitoring result of the accumulation monitoring unit 63 and receives the readout signal of the data from the accumulation monitoring unit 63, to allow the data multiplexing/demultiplexing apparatus to read the data.

Figure 6:
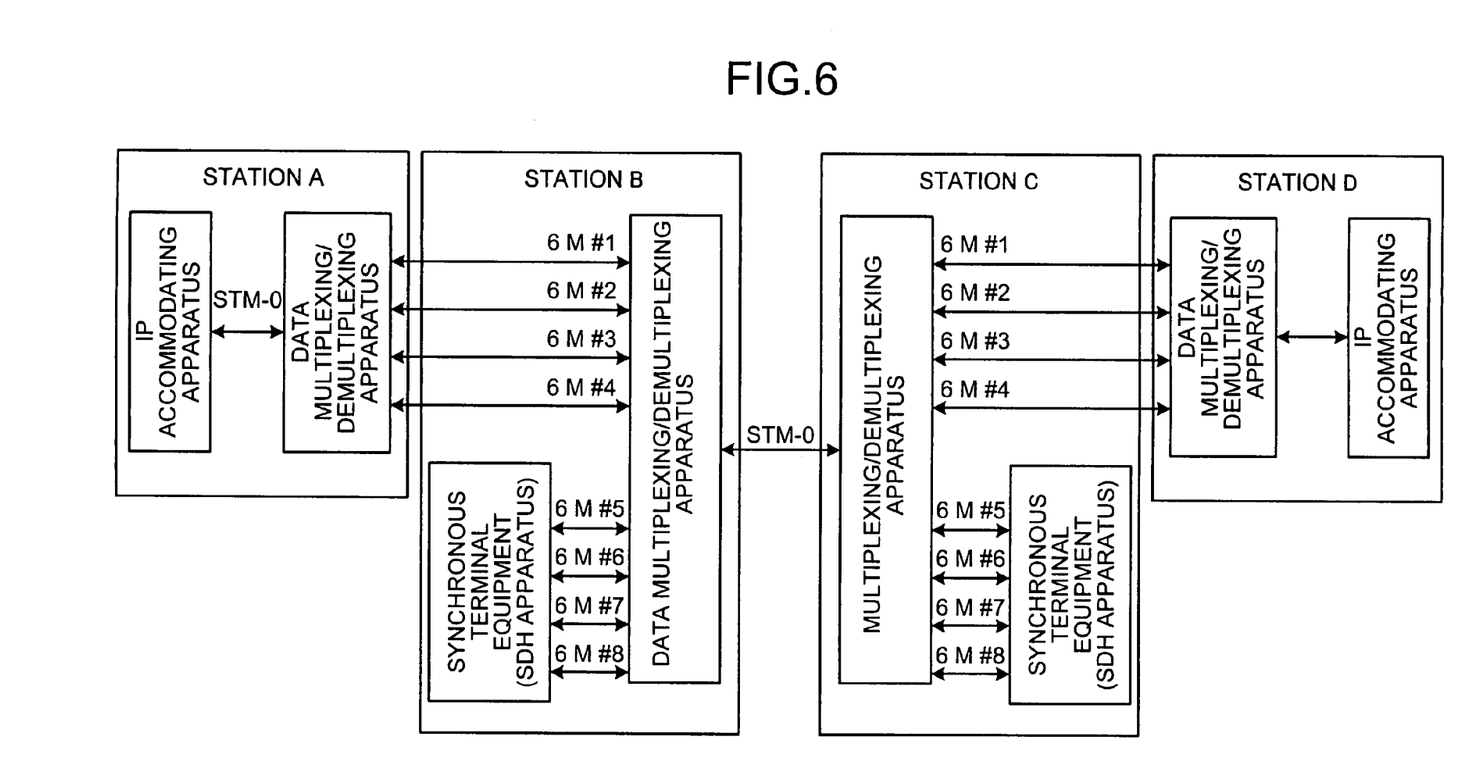
FIG. 6 is a schematic for illustrating a data multiplexing/demultiplexing transmission.

FIG. 6 is a schematic for illustrating a data multiplexing/demultiplexing transmission. The data multiplexing/demultiplexing apparatuses positioned in stations A and D station correspond to the data multiplexing/demultiplexing system according to the first embodiment, and the data multiplexing/demultiplexing apparatuses positioned in stations B and C correspond to the data multiplexing/demultiplexing system according to the second embodiment. That is, the data multiplexing/demultiplexing apparatuses positioned in stations B and C accommodate the line group having the bulk structure by 6 M #1 to #4, accommodate the frame phase-free line from synchronous terminal equipment (synchronous digital hierarchy (SDH) apparatus) by 6 M #5 to #8, and perform data multiplexing/demultiplexing transmission to the same transmission line.

Thus, it is selected by the reception buffer 62 whether to read data according to the apparatus reference frame phase, or to monitor whether the data has been accumulated in the specified amount or more and read the data according to the monitoring result. Accordingly, the line group having the bulk structure and the frame phase-free line can be accommodated simultaneously on the same transmission line.

The respective constituents of each apparatus shown in the drawings are functionally conceptual, and physically the same configuration is not always necessary. In other words, the specific mode of dispersion and integration of each apparatus is not limited to the shown ones, and all or a part thereof can be functionally or physically dispersed or integrated in an optional unit, according to the various kinds of load and the status of use. For example, the data multiplexing/demultiplexing apparatus 10 and each of the lines 20 to 50 shown in FIG. 2 can be integrated. Furthermore, all or an optional part of the various process functions performed by each apparatus can be realized by a central processing unit (CPU) or a program analyzed and executed by the CPU, or can be realized as hardware by the wired logic.

Of the respective processes explained in the embodiments, all or a part of the processes explained as being performed automatically can be performed manually, or all or a part of the processes explained as being performed manually can be performed automatically in a known method. The information including the process procedures, control procedures, specific names, and various kinds of data and parameters shown in the specification or in the drawings can be optionally changed, unless otherwise specified.

According to the present invention, the apparatus reference frame phase as the reference in the apparatus is generated based on the reception frame phase of the data input to the predetermined reception buffer and the optional delay amount, the data is read from the reception buffer according to the generated apparatus reference frame phase, and the data is subjected to multiplexing or demultiplexing. Accordingly, it is prevented that readout of data from the reception buffer fails, and the time from data input to the reception buffer until readout of the data therefrom is shortened, thereby enabling the frame phase compensation and reduction of the transfer delay.

Furthermore, according to the present invention, the apparatus reference frame phase is generated based on the optional delay amount obtained by taking into consideration any one of the fluctuation of the data input to the reception buffer and the phase difference of data input to the reception buffer or both. Accordingly, the apparatus reference frame phase is generated based on more appropriate delay amount, thereby enabling reduction of the transfer delay, while compensating the frame phase more appropriately.

Moreover, according to the present invention, the apparatus reference frame phase is generated based on the optional delay amount obtained by taking into consideration any one of the fluctuation and the phase difference obtained beforehand or both. Accordingly, for example, the apparatus reference frame phase can be easily generated without monitoring the fluctuation or the phase difference in real time.

Furthermore, according to the present invention, the delay amount is measured corresponding to a change in any one of the fluctuation and the phase difference or both, to generate the apparatus reference phase frame based on the delay amount obtained from the measurement. Accordingly, the apparatus reference phase frame can be generated more appropriately corresponding to the real-time change, without presetting and fixing the apparatus reference phase frame.

Moreover, according to the present invention, it is monitored whether data has been accumulated in a specified amount or more in the reception buffer, and it is then selected whether to read the data or to read the data according to the monitoring result. When the data is read according to the monitoring result, readout of the data is performed according to the monitoring result. Accordingly, the line group having the bulk structure and the frame phase-free line can be accommodated simultaneously on the same transmission line.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for multiplexing or demultiplexing data between a high-speed line and a low-speed line using a reception buffer and a transmission buffer, the apparatus comprising:
    a generating unit that generates an apparatus reference frame phase that becomes a reference in the apparatus, based on a reception frame phase of a data input to a predetermined reception buffer and a predetermined delay amount;
    a monitoring unit that monitors whether a specific amount of the data is accumulated in the reception buffer;
    a selecting unit that selects to read the data based on the apparatus reference frame phase or based on a result of monitoring by the monitoring unit;
    a data reading unit that reads the data from the reception buffer based on the apparatus reference frame phase or based on the result of the monitoring by the monitoring unit, according to a selection by the selecting unit; and
    a multiplexing/demultiplexing unit that multiplexes or demultiplexes the data read by the data reading unit.

2. The apparatus according to claim 1, wherein
the predetermined delay amount is obtained by taking into consideration at least one of a fluctuation of data input to the reception buffer and a phase difference of the data.

3. The apparatus according to claim 1, wherein
the predetermined delay amount is set in advance.

4. The apparatus according to claim 2, wherein
the generating unit measures the at least one of the fluctuation of the data and the phase difference of the data to obtain the predetermined delay amount.

5. The apparatus according to claim 1 wherein
the generating unit selects the predetermined reception buffer based on a phase difference of the data input to the reception buffer.

6. A method of multiplexing or demultiplexing data between a high-speed line and a low-speed line using a reception buffer and a transmission buffer, the method comprising:
    generating an apparatus reference frame phase that becomes a reference in the apparatus, based on a reception frame phase of a data input to a predetermined reception buffer and a predetermined delay amount;
    monitoring whether a specific amount of the data is accumulated in the reception buffer;
    selecting to read the data based on the apparatus reference frame phase or based on a result of the monitoring;
    reading the data from the reception buffer based on the apparatus reference frame phase or based on the result of the monitoring, according to the selecting; and
    multiplexing or demultiplexing the data read from the reception buffer.

7. A computer-readable recording medium that stores a computer product for multiplexing or demultiplexing data between a high-speed line and a low-speed line using a reception buffer and a transmission buffer, wherein the computer product causes a computer to execute:
    generating an apparatus reference frame phase that becomes a reference in the apparatus, based on a reception frame phase of a data input to a predetermined reception buffer and a predetermined delay amount;
    monitoring whether a specific amount of the data is accumulated in the reception buffer;
    selecting to read the data based on the apparatus reference frame phase or based on a result of the monitoring;
    reading the data from the reception buffer based on the apparatus reference frame phase or based on the result of the monitoring, according to the selecting; and
    multiplexing or demultiplexing the data read from the reception buffer.

* * * * *

UNITED STATES PATENT AND TRADEMARK OFFICE
CERTIFICATE OF CORRECTION

PATENT NO.        : 7,672,329 B2
APPLICATION NO.   : 11/340840
DATED             : March 2, 2010
INVENTOR(S)       : Kenichi Ishikawa It is certified that error appears in the above-identified patent and that said Letters Patent is hereby corrected as shown below:

Column 8, Line 22, change "claim 1" to --claim 1,--.

Signed and Sealed this

Twenty-fifth Day of May, 2010

David J. Kappos
*Director of the United States Patent and Trademark Office*